United States Patent
König et al.

(10) Patent No.: US 6,606,488 B1
(45) Date of Patent: Aug. 12, 2003

(54) COMMUNICATIONS RECEIVER WITH INTERMODULATION REDUCTION, AND METHOD

(75) Inventors: Matthias König, Taunusstein (DE); Stefan Lichterfeld, Taunusstein (DE)

(73) Assignee: Motorola, Inc., Schaumburg, IL (US)

( * ) Notice: Subject to any disclaimer, the term of this patent is extended or adjusted under 35 U.S.C. 154(b) by 458 days.

(21) Appl. No.: 09/718,593

(22) Filed: Nov. 22, 2000

(51) Int. Cl.[7] ............................... H04B 1/10
(52) U.S. Cl. ................ 455/295; 455/296; 455/338
(58) Field of Search ................. 455/295, 296, 455/232.1, 234.2, 210, 217, 201, 250.1, 254, 338, 340

(56) References Cited

U.S. PATENT DOCUMENTS

| | | | | |
|---|---|---|---|---|
| 5,564,094 A | * | 10/1996 | Anderson et al. ............ | 455/295 |
| 6,035,185 A | * | 3/2000 | Dobrovolny et al. ........ | 455/266 |
| 6,052,566 A | * | 4/2000 | Abramsky et al. .......... | 455/67.1 |
| 6,208,849 B1 | * | 3/2001 | Cho et al. .................... | 455/296 |
| 6,288,609 B1 | * | 9/2001 | Brueske et al. ............. | 330/129 |
| 6,393,011 B1 | * | 5/2002 | Kim ............................ | 370/342 |

* cited by examiner

*Primary Examiner*—Edward F. Urban
*Assistant Examiner*—Simon Nguyen
(74) *Attorney, Agent, or Firm*—Stevens R. Santema

(57) ABSTRACT

In a communications receiver (100) with a front stage (110) for receiving a transmitted RF input signal and a mixer stage (130) for mixing the RF input signal with an oscillator signal (OS) to provide an intermediate frequency (IF) signal, wherein the front stage (110) and the mixer stage (130) are coupled by an interconnecting section (130), intermodulation (IM) effects are reduced by (a) creating a forward (F) current through the section (120) by forward current means (R1, R3, R5, R4, C3, C1, C3, PD1, switch 140), (b) creating a reverse (R) current through the section (120) by reverse current means, (c) selectively coupling forward (F) and reverse (R) current means to the section (120) by selector means (140), to reduce the amplitude of the signal (RF OUT), which is applied to the mixer stage (130), and (d) operating the mixer stage in its linear operating range.

7 Claims, 1 Drawing Sheet

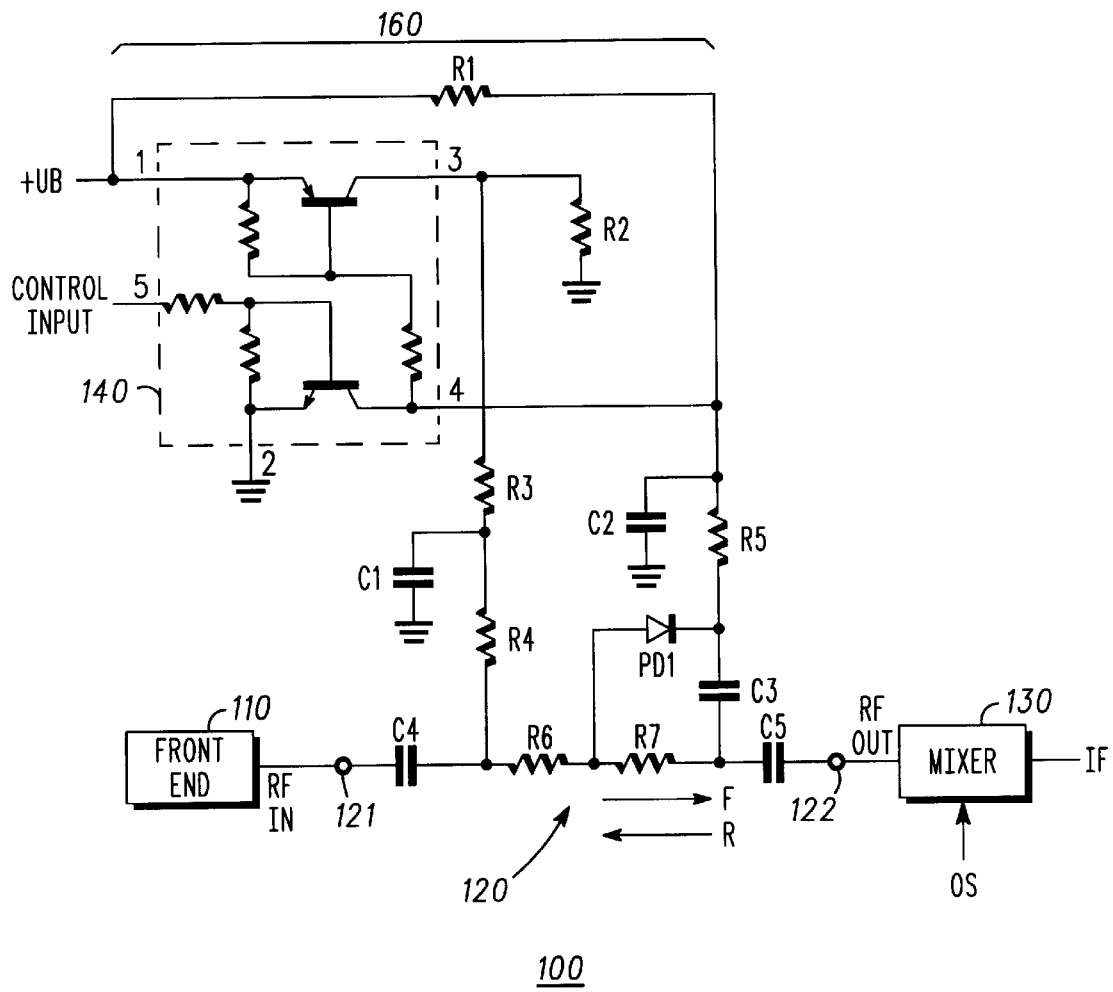

ly low input signals (wanted and unwanted signals) the pad is applicable; c) the intermodulation protection is not satisfactory or not sufficient at high receiver input signals.

COMMUNICATIONS RECEIVER WITH INTERMODULATION REDUCTION, AND METHOD

FIELD OF THE INVENTION

The present invention generally relates to intermodulation (IM) reduction in communications receivers and in particular in communications receivers comprising a front end stage for receiving a transmitted radio frequency (RF) input signal and a mixer stage for mixing the RF input signal and an oscillator signal so as to provide an intermediate frequency signal or baseband signal.

BACKGROUND OF THE INVENTION

In a communications receiver a plurality of applied input signals with slightly different frequencies often create intermodulation signals due to non-linear characteristics of transfer elements in the communications receiver. The most important intermodulation signals are the second order and third order intermodulation signals, respectively. These intermodulation signals affect the receiver performance detrimentally when they fall into the traffic band. Since intermodulation signals become particularly strong in receivers when the signals of the interfering transmitters are very strong, prior art communications receivers are equipped with a real resistive pad. The impedance of such pads is equal to the path impedance of the RF signal. The pad attenuation is fixed and in some cases it may be manually switched in or out. The disadvantage of such fixed real resistive pads is: a) the intermodulation improvement versus receiver sensitivity degradation is not optimized; b) only at relatively low input signals (wanted and unwanted signals) the pad is applicable; c) the intermodulation protection is not satisfactory or not sufficient at high receiver input signals.

The present invention seeks to provide means for reducing or even suppressing intermodulation signals in the traffic band and to mitigate or avoid the above disadvantages and limitations of the prior art.

BRIEF DESCRIPTION OF THE DRAWINGS

The sole FIGURE is a circuit diagram of a preferred embodiment of the present invention.

DETAILED DESCRIPTION OF A PREFERRED EMBODIMENT

The sole FIGURE is a circuit diagram of communications receiver 100 in a preferred embodiment of the present invention.

The optimum IM improvement is provided by an electronically switched IM reduction circuit (e.g. circuit 160) which has an impedance which differs substantially from the impedance of the RF source, that is the front end stage of the communications receiver and the RF load, that is the mixer stage. When the IM reduction circuit is activated this is called the intermodulation (IM) reduction mode of the receiver, otherwise it is called normal (non-reduction) mode. Preferably the impedance of the IM reduction circuit in the IM reduction mode is much higher than that of the front end stage and that of the mixer stage, respectively. In case of the normal mode the IM reduction circuit provides the same impedance as the front end stage and the mixer stage, respectively, but with a loss that may even be as small as 0 dB if desired. The improvement as to intermodulation reduction is achieved by a special and very cost effective reverse biasing circuitry with a single supply voltage which provides optimum performance at all RF input levels even at the highest ones.

Communications receivers, such as receiver 100 of the invention, comprise a front end stage 110 for receiving an RF signal that is transmitted from a remote transmitter unit (not shown). The received RF signals are modulated with information of lower frequency than the frequency of the carrier. In order to regain this information there is a mixer stage 130 provided for mixing the RF signal and an oscillator signal (OS) so as to provide an intermediate frequency (IF) signal (term "IF signal" comprising "baseband signal"). The front end stage 110 is connected to the mixer stage 130 by an interconnecting section 120 (e.g., R6, R7). According to the invention there is a IM reduction circuit 160 interposed between the front end stage 110 and the mixer stage 130 on the interconnecting section 120.

It should be understood that this IM reduction circuit needs neither be the immediate stage after the front end stage nor the immediate stage before the mixer stage, but that there may be other stages between the IM reduction circuit and the front end stage and mixer stage, respectively, namely amplifiers, filters, additional detectors (e.g. for signal strength) etc.

In order to compensate for any excessive signal strength that is applied to the mixer stage and leads to non linear distortions the communications receiver in the FIGURE comprises reverse current means (e.g., R1, R3, R5, R4, C3, C1, C3, PD1, switch 140) for creating a reverse current (arrow "R") through the interconnecting section 120. The interconnecting section receives an RF input signal at its input 121 and provides an RF output signal that is applied to the mixer stage at output 122. The reverse current that is created by the reverse current means lowers the level of the RF output signal and thus helps to decrease the requirements as to the dynamic range of the following stages, in particular of the mixer stage. (The current is normally very small and instead of referring to the current one may also refer to the respective voltage.)

The reverse current means comprise a first resistor R1 that is connected to a supply potential $+U_B$ at its first terminal pin. At its second terminal pin, the resistor R1 is connected to a first terminal pin of a second resistor R5 and to a first terminal pin of an RF bypass capacitor C2. Further, a switching element 140 is connected to the second terminal pin of R1. This switching element will be described below. The second resistor R5 is connected at its second terminal pin to the cathode of a diode PD1. The anode of the diode PD1 is connected to the interconnecting section R6/R7 between the front end stage 110 and the mixer stage 130 of the receiver 100 at the connecting point of two resistors R6 and R7. The resistor R6 is connected to the first terminal pin of a resistor R4 and to the first terminal pin of a coupling capacitor C4. At the second terminal pin of the coupling capacitor C4 the RF input signal is applied. Similarly, the resistor R7 is connected to the first terminal pin of a coupling capacitor C5, which in turn provides an RF output signal at its second terminal pin. The resistor R4 is connected to a first terminal of an ohmic voltage divider comprising resistors R3 and R2 and to an RF bypass capacitor C 1. The second terminal of the voltage divider, i.e. the free terminal pin of R2 is connected to ground. The third terminal of the voltage divider, i.e. the connecting point of the resistors R3 and R2 is connected to the switching element 140, which will be described below.

An additional capacitor C3 is provided between the cathode of the diode PD1 and the connecting point of the resistor R7 and the coupling capacitor C5. C3 is used to allow a high reverse voltage for best intermodulation performance at high RF signal levels.

In the IM reduction mode, the IM reduction circuit supplies a current to the interconnecting section between C4 and C5 that flows in the direction from the RF output terminal to the RF input terminal and lowers thus the input signal of the following stages (e.g., mixer 130).

In the normal mode of the IM reduction circuit a forward current flows through the interconnecting section (arrow "F"), which is created by a forward current means. In the FIGURE the forward current means is implemented by the identical components as the reverse current means, and the IM reduction circuit of the forward current means will not be described here again for sake of brevity. However, the direction of the current created by the forward current means and flowing through the interconnecting section is reversed as opposed to the current that is created by the reverse current means.

It is determined by the switching element that has been mentioned above, which of the currents that are created by the forward current means and the reverse current means, respectively, is supplied to the interconnecting section. The switching element has a first terminal pin 1 that is connected to the supply potential $+U_B$ and a second terminal pin 2 that is connected to ground. At a third terminal pin 3 the switching element is connected to the connecting point of R3 and R2, at a fourth terminal pin 4 the switching element is connected to the connecting point of R1 and R5. To a fifth terminal pin 5 of the switching element, i.e. a control pin, a control signal is applied. If the control signal is high, it renders the switching element conductive between the second terminal pin 2 and the fourth terminal pin 4 so as to draw the connecting point of R1 and R5 to ground potential. Moreover, due to the control signal, the switching element 140 is conductive between the first terminal pin 1 and the third terminal pin 3, thus applying the supply potential $+U_B$ to the connecting point of resistors R2 and R3. Accordingly the current flows in forward direction through resistor R6 on the interconnecting section: if the control signal is high the normal mode is activated.

To the contrary, if the control signal is low, the switching element is blocking and the potential at the first terminal pin I and the third terminal pin 3 as well as at the second terminal pin 2 and the fourth terminal pin 4 is different: the current through the interconnecting section flows in the direction RF output to RF input, the IM reduction mode is activated. Thus, the switching element selectively connects the forward current means and the reverse current means to the interconnecting section as a function of the logical state of the control signal. The forward current and the reverse current, respectively, is combined with the RF input signal on the interconnecting section and the RF output signal is provided which is of reduced amplitude. The reduced amplitude signal is applied to the following stages, i.e. a mixer stage so that the mixer stage is operated in its linear operating range and intermodulation effects are reduced.

In brief: the DC current flow in the FIGURE is in the normal mode (control signal=HIGH): +UB, pin 3, (pin 4), R3, R4, R6, R5 (to ground); the DC current flow is in the IM reduction mode (control signal=LOW): +UB, R1, R5, PD1, R6, R4, R3, R2 (to ground). C1, C2 are RF bypass caps; C4, C5 are RF coupling capacitors; R6, PD1 (ON-state), R6, R7, PD1 (OFF-state).

As to the dimension of these components in the circuitry, the values are chosen so that the impedance of the interconnecting section is substantially higher than the impedance of the front end stage and the mixer stage, respectively, in the IM reduction mode. Further the dimension of the components are chosen as to render the impedance of the interconnecting section substantially equal to the impedance of the front end stage and the mixer stage, respectively, in the normal mode.

In order to ensure a fast response of the above circuitry the diode PD1 is preferably chosen to be a PIN diode which serves as a switch that is useable up to very high frequencies and that allows a particularly low reverse current only.

The embodiments of the present invention overcome the above mentioned problems of the prior art. The following improvements are attained:

a) the intermodulation improvement is optimised versus receiver sensitivity degradation;

b) the circuit is also applicable at higher input signals (wanted and unwanted signals);

c) best intermodulation protection is provided even at high and very high receiver input signals;

d) the optimum performance can be met irrespectively of the type of the employed preselectors and image reject filters (fixed and varactor tuned filters);

e) although the intermodulation reducing circuit is preferably arranged just after the preamplifier (LNA) in the receiver section, the intermodulation reducing circuit can also be placed in other locations; and f) the intermodulation circuit is very cost efficient at low current drain.

A method for reducing intermodulation effects in a communications receiver (e.g., front end stage 110, a mixer stage 130, OS, IF signal), wherein the front end stage is connected to the mixer stage by an interconnecting section, comprises the steps of: (a) creating a forward current through the interconnecting section by forward current means, (b) creating a reverse current through the interconnecting section by reverse current means,(c) selectively connecting the forward current means and the reverse current means to the interconnecting section by selector means, so as to reduce the amplitude of the signal, which is applied to the mixer stage, and (d) operating the mixer stage in its linear operating range.

While the invention has been described in terms of particular structures, devices and methods, those of skill in the art will understand based on the description herein that it is not limited merely to such examples and that the full scope of the invention is properly determined by the claims that follow.

What is claimed is:

1. A communications receiver with a front end stage for receiving a transmitted RF input signal and a mixer stage for mixing the RF input signal with an oscillator signal so as to provide an intermediate frequency signal, wherein the front end stage is connected to the mixer stage by an interconnecting section, the communications receiver further comprising:

forward current means for creating a forward current through the interconnecting section, reverse current means for creating a reverse current through the interconnecting section, a switching element for selectively connecting the forward current means and said reverse current means to said interconnecting section, so as to combine said forward current and said reverse current, respectively, with said RF input signal and to provide an RF output signal of reduced amplitude which is applied to the mixer stage so that the mixer stage is operated in its linear operating range and intermodulation effects are reduced.

2. The communications receiver according to claim 1, wherein the impedance of said interconnecting section is substantially higher than the impedance of said front end stage and said mixer stage, respectively.

3. The communications receiver according to claim 1, wherein the impedance of said interconnecting section is substantially equal to the impedance of said front end stage and said mixer stage, respectively.

4. The communications receiver according to claim 1, comprising a PIN diode as a fast switch.

5. The communications receiver according to claim 1, wherein said intermediate frequency signal is a baseband signal.

6. The communications receiver according to claim 1, wherein said forward current means and said reverse current means are implemented by the same components.

7. A method for reducing intermodulation effects in a communications receiver having a front end stage for receiving a transmitted RF input signal and a mixer stage for mixing said RE input signal with an oscillator signal so as to provide an intermediate frequency signal, wherein said front end stage is connected to said mixer stage by an interconnecting section, said method comprising the steps of:
creating a forward current through said interconnecting section by forward current means,
creating a reverse current through said interconnecting section by reverse current means, and
selectively connecting said forward current means and said reverse current means to said interconnecting section by selector means, so as to reduce the amplitude of the signal, which is applied to the mixer stage, and the mixer stage is operated in its linear operating range.

\* \* \* \* \*